United States Patent
Tanemura et al.

(10) Patent No.: US 10,545,172 B2
(45) Date of Patent: Jan. 28, 2020

(54) CANTILEVER AND MANUFACTURING METHOD FOR CANTILEVER

(71) Applicants: NATIONAL UNIVERSITY CORPORATION NAGOYA INSTITUTE OF TECHNOLOGY, Nagoya-shi, Aichi (JP); OLYMPUS CORPORATION, Tokyo (JP)

(72) Inventors: Masaki Tanemura, Owariasahi (JP); Riteshkumar Ratneshkumar Vishwakarma, Nagoya (JP); Mohamad Saufi Bin Rosmi, Nagoya (JP); Yazid Bin Yaakob, Nagoya (JP); Yuji Wakamatsu, Nagoya (JP); Masashi Kitazawa, Ina (JP)

(73) Assignees: National University Corporation Nagoya Institute of Technology, Nagoya-shi, Aichi (JP); OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/121,729

(22) Filed: Sep. 5, 2018

(65) Prior Publication Data
US 2019/0018042 A1  Jan. 17, 2019

Related U.S. Application Data

(63) Continuation of application No. PCT/JP2017/002804, filed on Jan. 26, 2017.

(30) Foreign Application Priority Data

Mar. 17, 2016 (JP) ................. 2016-054095

(51) Int. Cl.
*G01Q 70/14* (2010.01)
*G01Q 70/16* (2010.01)
(Continued)

(52) U.S. Cl.
CPC .......... *G01Q 70/14* (2013.01); *B05D 3/0254* (2013.01); *B05D 3/107* (2013.01); *G01Q 70/12* (2013.01); *G01Q 70/16* (2013.01)

(58) Field of Classification Search
USPC ............. 850/52, 55, 56, 57, 58, 59, 60
See application file for complete search history.

(56) References Cited

U.S. PATENT DOCUMENTS

| 6,339,217 B1 * | 1/2002 | Kley | ............ G01Q 20/02 250/216 |
| 2002/0046953 A1 * | 4/2002 | Lee | .......... B82Y 15/00 205/104 |

(Continued)

FOREIGN PATENT DOCUMENTS

| CN | 102353817 A | 2/2012 |
| CN | 104360107 A | 2/2015 |

(Continued)

OTHER PUBLICATIONS

International Search Report dated Apr. 4, 2017 issued in PCT/JP2017/002804.

*Primary Examiner* — Nicole M Ippolito
(74) *Attorney, Agent, or Firm* — Scully, Scott, Murphy & Presser, P.C.

(57) ABSTRACT

A cantilever used in a scanning probe microscope includes a supporting section, a lever section, and a protrusion section, which is a probe. A crystalline carbon composite layer including a crystalline carbon nanomaterial and a metal material, a melting point of which is 420° C. or lower, is deposited on a distal end portion of the protrusion section.

20 Claims, 11 Drawing Sheets

(51) Int. Cl.
   *B05D 3/10*   (2006.01)
   *B05D 3/02*   (2006.01)
   *G01Q 70/12*   (2010.01)

(56) References Cited

U.S. PATENT DOCUMENTS

| | | | |
|---|---|---|---|
| 2005/0103993 A1* | 5/2005 | Guillorn | B82Y 15/00 |
| | | | 250/306 |
| 2011/0027872 A1* | 2/2011 | Aoki | B82Y 35/00 |
| | | | 435/287.1 |
| 2015/0309073 A1 | 10/2015 | Mirkin et al. | |
| 2018/0071797 A1* | 3/2018 | Nirmalraj | B08B 3/08 |

FOREIGN PATENT DOCUMENTS

| | | |
|---|---|---|
| JP | 4970619 B2 | 7/2012 |
| JP | 2013-098396 A | 5/2013 |
| JP | 5705315 B2 | 4/2015 |
| WO | WO 2014/011954 A1 | 1/2014 |
| WO | WO 2014/090938 A1 | 6/2014 |

\* cited by examiner

FIG. 5A      FIG. 5B      FIG. 5C
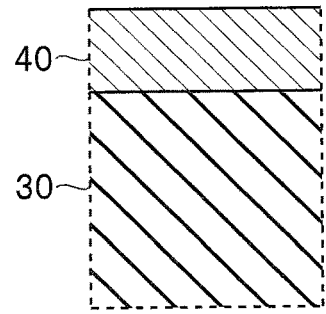
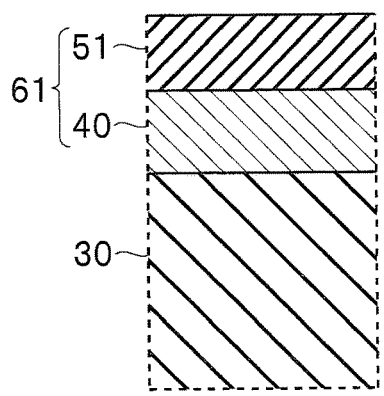
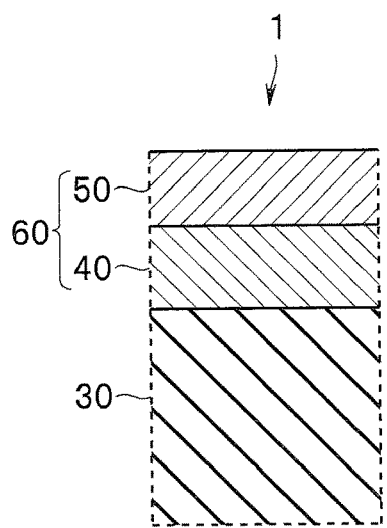
FIG. 6
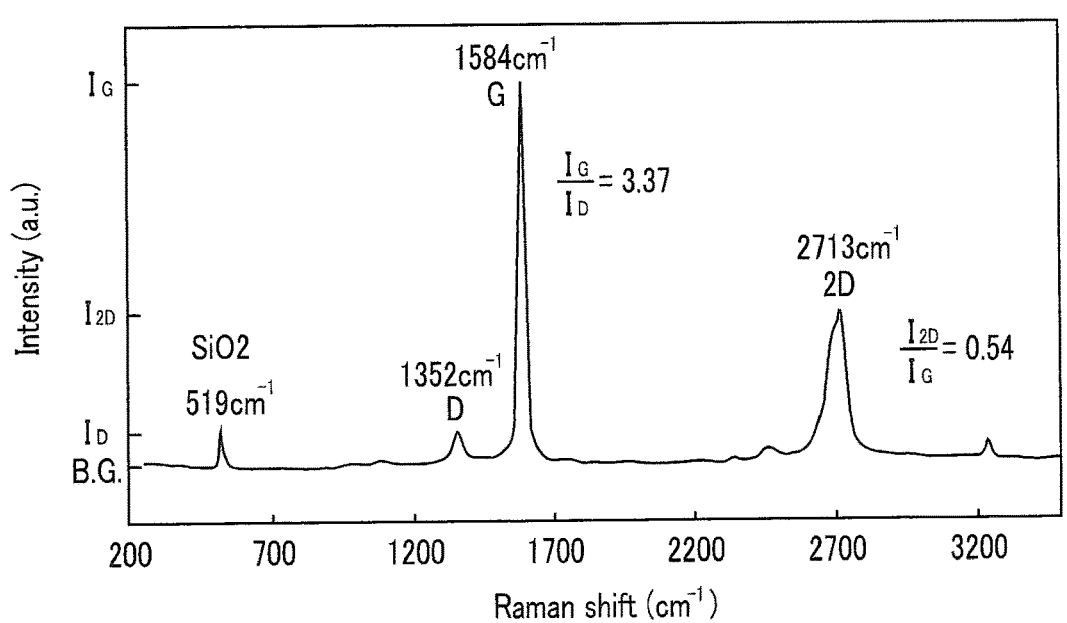

FIG. 10
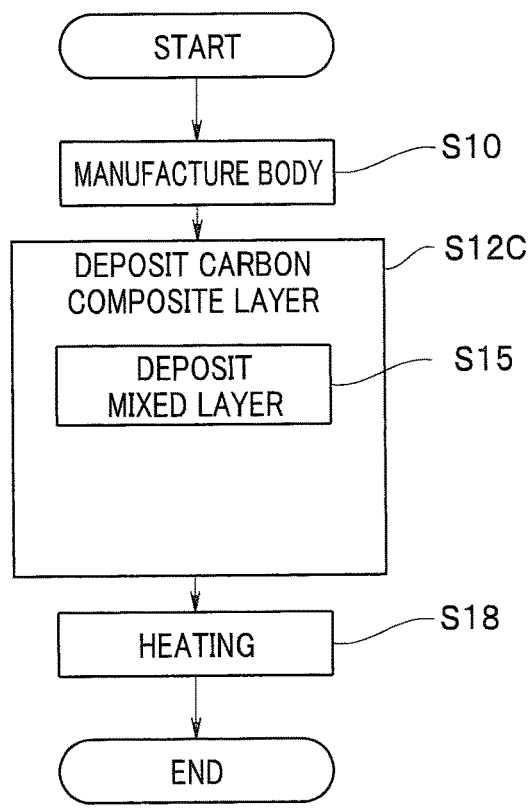
FIG. 11A   FIG. 11B   FIG. 11C
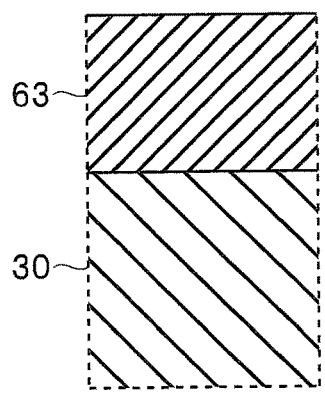
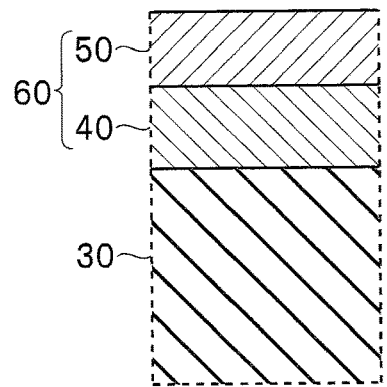
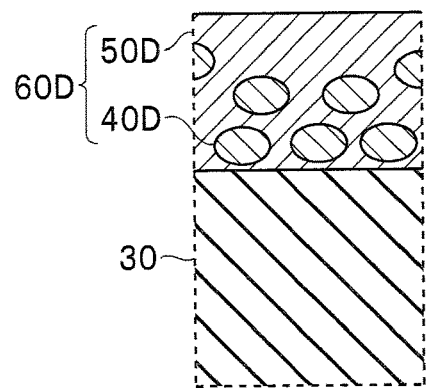

CANTILEVER AND MANUFACTURING METHOD FOR CANTILEVER

CROSS REFERENCE TO RELATED APPLICATION

This application is a continuation application of PCT/JP2017/002804 filed on Jan. 26, 2017 and claims benefit of Japanese Application No. 2016-054095 filed in Japan on Mar. 17, 2016, the entire contents of which are incorporated herein by this reference.

BACKGROUND OF INVENTION

1. Field of the Invention

The present invention relates to a cantilever used in a scanning probe microscope and a manufacturing method for the cantilever.

2. Description of the Related Art

An SPM (scanning probe microscope) is suitable for detecting a shape of a sample surface at high resolution. The SPM is used for measurement of a surface shape of a semiconductor, an optical disk, a biological sample, or the like. To detect a nanoscale microstructure, a distal end portion of a protrusion section of a cantilever used in the SPM is sharp.

To perform various electric characteristic measurements, a cantilever made of silicon or the like is made electrically conductive by depositing a metal layer made of conductive metal, for example, platinum on the cantilever.

When the metal layer is deposited on a surface of the cantilever, the distal end portion of the protrusion section increases in thickness by a thickness of the metal layer. It is likely that a distal end of the cantilever does not reach a bottom of a fine recessed part. That is, when a curvature radius R of the distal end portion increases due to the deposition of the metal layer, spatial resolution decreases. Therefore, the thickness of the metal layer for making the cantilever electrically conductive is desirably smaller.

However, when the thickness (average thickness) of the metal layer is small, structure of the metal layer tends to be island-shaped rather than a continuous layer. Because islands do not bring about a conductive state, the surface of the cantilever cannot be sufficiently made electrically conductive by the thin metal layer. For example, when a platinum layer having thickness of 20 nm is deposited on a surface of a cantilever, a curvature radius R of a distal end portion of which is 5 nm, the curvature radius R of the distal end portion increases to 25 nm.

Chinese Patent Application Publication No. 102353817 specification and International Publication No. 2014/090938 disclose a cantilever, on a surface of which a graphene layer is deposited. Even if the graphene layer is a single layer, the graphene layer has extremely high electron mobility and is suitable as a conductive layer of a cantilever.

In the cantilever disclosed in Chinese Patent Application Publication No. 102353817 specification, one or several graphene layers are deposited on a Ni layer by a CVD method.

Although not disclosed in the specification in detail, it is well known for those skilled in the art that, in a manufacturing method for a graphene layer including Ni as a metal catalyst, a thermochemical vapor-phase synthesis method for heating hydrocarbon such as methane to approximately 1000° C. and causing the hydrocarbon to react is used.

Japanese Patent Application Laid-Open Publication No. 2013-98396 discloses a manufacturing method for graphene by a non-transfer method for heating a carbon compound layer including silicon. In the method, a carbon compound changes to graphene with the silicon acting as a catalyst according to heating at 1200° C. or higher.

Japanese Patent No. 4970619 specification describes a manufacturing method for a graphene film including a step of bringing an amorphous carbon film and gallium (Ga) into contact and forming a graphene film on a contact interface. Further, it is described that the same effect is analogized for indium (In), tin (Sn), and antimony (Sb) as well based on the same characteristic as a characteristic of gallium.

According to the specification, gallium and carbon are a whole non-solid solution in terms of metallurgy. However, the amorphous carbon film is considered to change to the graphene film because, in a vacuum, during heat treatment at approximately 1000° C., atomic bond is formed on an interface between solid carbon atoms and liquid gallium atoms.

That is, in a graphene depositing method by a conventional non-transfer method or atomic binding method, at least high-temperature heating at approximately 1000° C. is indispensable.

On the other hand, the cantilever disclosed in International Publication No. 2014/090938 is manufactured by a so-called transfer method for forming a thin layer of poly methyl methacrylate (PMMA) as an intermediate layer and boning a separately-manufactured graphene sheet.

Japanese Patent No. 5705315 specification describes a roll-to-roll process for, after forming a graphene layer, transferring the graphene layer onto a rolled and deformed base material including a metal catalysis layer at 500° C. or lower.

SUMMARY OF THE INVENTION

A cantilever in an embodiment of the present invention is a cantilever used in a scanning probe microscope, the cantilever including a supporting section, a lever section, and a protrusion section, which is a probe. A crystalline carbon composite layer including a crystalline carbon nanomaterial and a metal material, a melting point MP of which is 420° C. or lower, is deposited on a distal end portion of the protrusion section.

A manufacturing method for a cantilever in another embodiment of the present invention is a manufacturing method for a cantilever in which a crystalline carbon layer made of a crystalline carbon nanomaterial is deposited on a distal end portion of a protrusion section of a cantilever body including a supporting section, a lever section, and the protrusion section, which is a probe. The manufacturing method for the cantilever includes: a step in which the cantilever body is manufactured; a carbon-composite-layer depositing step in which a carbon composite layer including a metal material, a melting point MP of which is 420° C. or lower, and a carbon material is deposited on the distal end portion of the protrusion section; and a heating step in which a temperature is 450° C. or lower.

BRIEF DESCRIPTION OF THE DRAWINGS

FIG. 5A is a partial sectional view for explaining the manufacturing method for the cantilever in the embodiment;

FIG. 5B is a partial sectional view for explaining the manufacturing method for the cantilever in the embodiment;

FIG. 5C is a partial sectional view of the cantilever in the embodiment;

FIG. 6 is a Raman spectroscopic analysis result of a graphene composite layer in the embodiment;

FIG. 10 is a flowchart of a manufacturing method for a cantilever in a modification 3;

FIG. 11A is a partial sectional view for explaining the manufacturing method for the cantilever in the modification 3;

FIG. 11B is a partial sectional view of the cantilever in the modification 3;

FIG. 11C is a partial sectional view of a cantilever in a modification 4;

DETAILED DESCRIPTION OF THE PREFERRED EMBODIMENT

Embodiment

<Structure of Cantilever>

Figure 1:
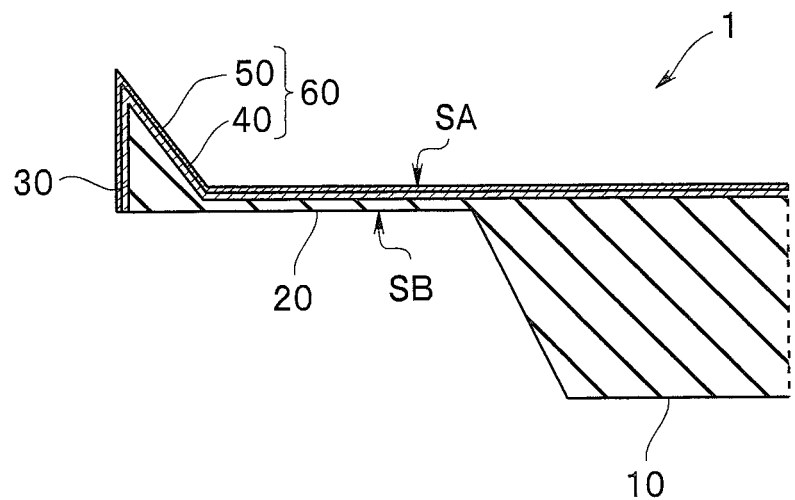
FIG. 1 is a sectional view of a cantilever in an embodiment.
Figure 2:
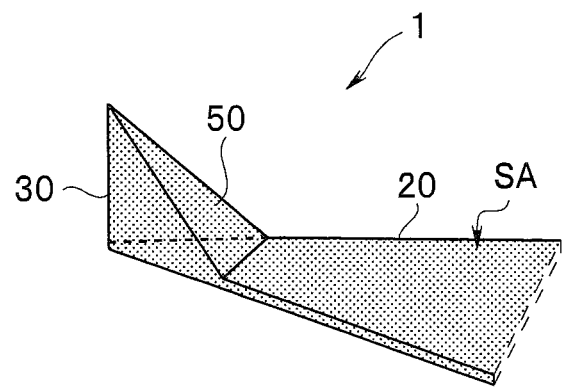
FIG. 2 is a partial perspective view of the cantilever in the embodiment.

A sectional view of a cantilever 1 for a scanning probe microscope in the embodiment is shown in FIG. 1. A partial perspective view of the cantilever 1 is shown in FIG. 2.

Note that in the following explanation, drawings based on each embodiment are schematic and relations between thicknesses and widths of respective portions, ratios of the thicknesses of the respective portions, and the like are different from actual ones. Portions having different relations and ratios of dimensions are sometimes included among the drawings. Illustration of some components and reference numerals and signs attached to some components are sometimes omitted.

The cantilever 1 includes a supporting section 10, a lever section 20, and a protrusion section 30, which is a probe. The lever section 20, which is a cantilever beam, is extended from the supporting section 10. The protrusion section 30 having a tetrahedral (trigonal pyramid) shape is formed on a free end side of the lever section 20. A sharp distal end portion of the protrusion section 30 follows nanoscale fine unevenness.

The supporting section 10, the lever section 20, and the protrusion section 30 are manufactured by machining a silicon wafer.

In the cantilever 1, a graphene composite layer 60, which is a crystalline carbon composite layer, is deposited on an upper surface SA on which the protrusion section 30 is formed. The graphene composite layer 60 is found by a metal layer 40 and a graphene layer 50, which is a crystalline carbon layer, on the metal layer 40.

The graphene layer 50 is made of graphene, which is a crystalline carbon nanomaterial. The graphene referred to in the specification includes single layer graphene having thickness of approximately 0.3 nm in which a layer of two-dimensionally arrayed carbon atoms is one layer and multilayer graphene in which a plurality of layers of the single layer graphene are stacked.

Note that as explained below, thickness of the graphene layer 50 in the embodiment is 1.5 nm. Therefore, the graphene layer 50 is multilayer graphene including four to five layers of the single layer graphene.

A metal material of the metal layer 40 is a catalyst used to form the graphene layer 50 as explained below. In other words, the metal material plays a catalyst action in response to a graphene formation reaction. In the embodiment, the metal material is made of Sn. Thickness of the metal layer 40 is 3 nm. That is, thickness of the graphene composite layer 60 including the graphene layer 50 and the metal layer 40 is 4.5 nm.

Note that thickness is an arithmetical means of thicknesses obtained by measuring a plurality of parts of the distal end portion of the protrusion section 30 using a transmission electron microscope (TEM). That is, thickness of a layer refers to thickness of layers deposited in the distal end portion of the protrusion section 30. A curvature radius R was measured using a scanning electron microscope (SEM). As a resistance value, probe resistance was measured by an atomic force microscope (AFM).

In the cantilever 1, a curvature radius R of a distal end portion coated with the graphene composite layer 60 was 8 nm. Probe resistance was approximately 1 MΩ and was low resistance equivalent to probe resistance at the time when a platinum layer of 20 nm was deposited.

Note that in the above explanation, the crystalline carbon material is the graphene. However, the crystalline carbon material refers to a carbon material, 5 at % or more of entirety of which is crystallized. The crystalline carbon material may be a composite layer of the graphene and other carbon crystal materials. For example, the graphene may include a carbon nanofiber or a carbon nanotube.

Figure 3:
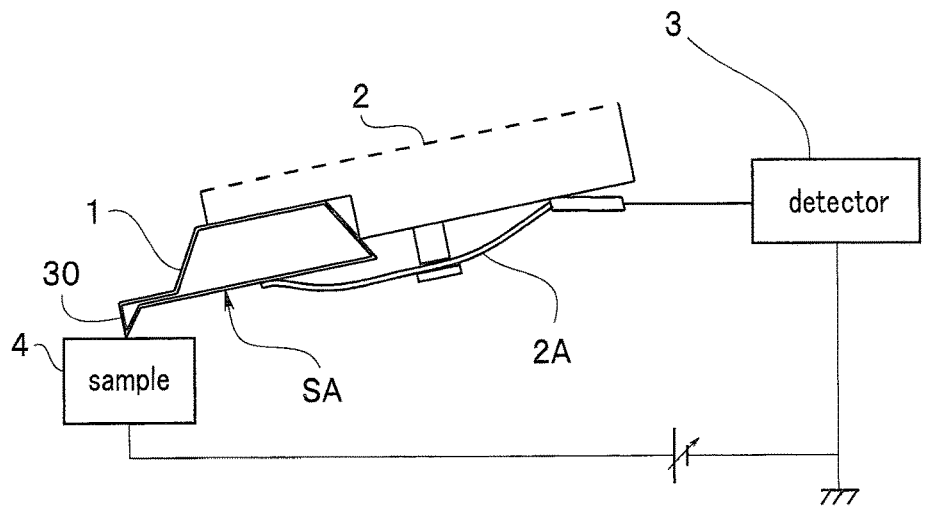
FIG. 3 is an explanatory diagram showing a part of a scanning probe microscope using the cantilever in the embodiment.

In FIG. 3, a measurement state of SCM (scanning capacitance) measured using the cantilever 1 is shown. The cantilever 1 is fixed to a jig 2. A lead wire 2A is electrically connected to the upper layer 5A. The lead wire 2A is connected to a detector 3. A distal end of the protrusion section of the cantilever 1 comes into contact with a sample 4, whereby local electric capacitance of a surface of the sample 4 is detected.

Electric capacitance detected using the cantilever 1 was substantially the same as the cantilever 1 on which a platinum layer having thickness of 20 nm was deposited.

As explained above, in the cantilever 1, the graphene layer 50, which is ultrathin but has low resistance, is deposited on the distal end portion of the protrusion section 30 by a non-transfer method including low-temperature heat treatment rather than a transfer method. Therefore, manufacturing is easy. Further, a graphene layer, which is ultrathin but is a continuous film and has low electric resistance, is deposited on the cantilever 1. Therefore, the curvature radius R of the distal end portion is 8 nm. The cantilever 1 showed higher spatial resolution than a cantilever, a curvature radius R of which was 25 nm, on which a platinum layer having thickness of 20 nm was deposited. That is, the cantilever 1 has low resistance and has high spatial resolution.

The graphene layer 50 is excellent in chemical stability and abrasion resistance. Therefore, even if the cantilever 1 was used for a long period, deterioration was smaller and durability was more excellent than the conventional cantilever. A long-term use was possible. In particular, when a biological sample was measured, a distal end of the cantilever 1 was less easily stained. Therefore, a stable image was able to be observed for a long time period.

<Manufacturing Method for the Cantilever>

Figure 4:
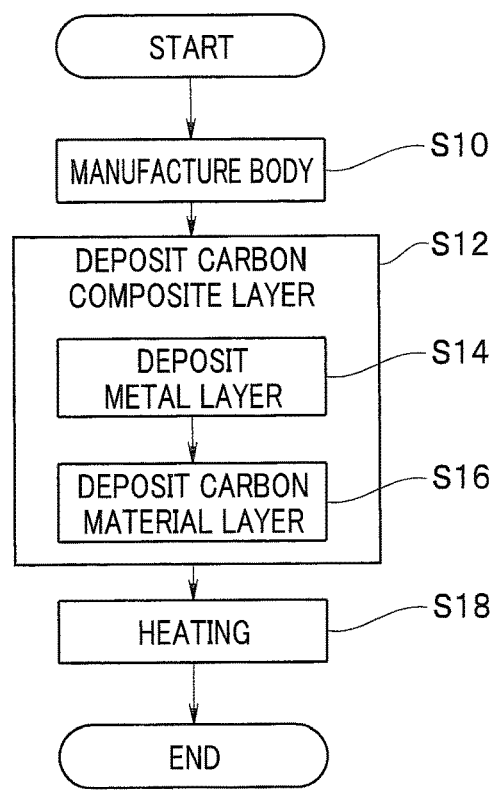
FIG. 4 is a flowchart of a manufacturing method for the cantilever in the embodiment.

A manufacturing method for the cantilever 1 is explained according to a flowchart of FIG. 4.

<Step S10> Body Manufacturing Step

A cantilever body including the supporting section 10, the lever section 20, and the protrusion section 30, which is the probe, is manufactured. The cantilever body is manufactured by machining a single crystal silicon wafer. The protrusion section 30 is a tetrahedral type including two surfaces perpendicular to an upper surface of the lever section 20 and a (111) surface having an angle of approximately 55 degrees.

The lever section 20 and the protrusion section 30 of the cantilever body may be configured by a material different from silicon, for example, silicon nitride.

Note that a distal end of the protrusion section 30 may be sharpened by a publicly-known method, for example, a Focus Ion Beam method or a low-temperature thermal oxidation treatment. Note that a curvature radius R of a distal end portion of the cantilever body in the embodiment was 5 nm.

<Step S12> Carbon-Composite-Layer Depositing Step

A carbon composite layer 61 including a metal material and a carbon material is deposited on a surface of the cantilever body. In the manufacturing method in the embodiment, a carbon-composite-layer depositing step includes a metal-layer depositing step and a carbon-material-layer depositing step for depositing a carbon material layer 51 on the metal layer 40.

<Step S14> Metal-Layer Depositing Step

As shown in FIG. 5A, the metal layer 40 made of Sn was deposited on the surface of the cantilever body (the protrusion section 30). FIG. 5A and the like are partial sectional views of the distal end portion of the protrusion section 30. However, the metal layer 40 was deposited on the supporting section 10 and the lever section 20 as well.

That is, the metal layer 40 made of Sn was deposited 3 nm in a vacuum by a laser abrasion method. A degree of vacuum was within a range of $1.0 \times 10^{-5}$ Pa to $9.9 \times 10^{-5}$ Pa, more specifically, within a range of $3 \times 10^{-5}$ Pa to $7 \times 10^{-5}$ Pa.

<Step S16> Carbon-Material-Layer Depositing Step

As shown in FIG. 5B, the carbon material layer 51 made of amorphous carbon was deposited on the metal layer 40. The carbon material layer 51 was also deposited 1.5 nm in a vacuum by the laser abrasion method. A degree of vacuum is the same as the degree of vacuum in the metal-layer depositing step.

<Step S18> Heating step

Heating at 250° C. for one hour was performed in a vacuum. Thereafter, cooling was performed to room temperature. In the heating, a cantilever was attached to a substrate heating holder. Control was performed based on a temperature of the heating holder. Because silicon has high thermal conductivity, the temperature of the heating holder can be regarded as a temperature of the cantilever. Note that a degree of vacuum during the heating was within a range of $1.0 \times 10^{-4}$ Pa to $9.9 \times 10^{-4}$ Pa, more specifically, within a range of $1 \times 10^{-4}$ Pa to $7 \times 10^{-4}$ Pa.

As shown in FIG. 5C, according to heating treatment, the carbon composite layer 61 changed to the graphene composite layer 60 having thickness of 4.5 nm, which is a crystalline carbon composite layer including the metal layer 40 and the graphene layer 50, which is crystalline carbon, on the metal layer 40.

As already explained, the curvature radius R of the distal end portion of the cantilever body before depositing the carbon composite layer 61 was 5 nm and the curvature radius R of the cantilever 1 on which the crystalline carbon composite layer 60 was deposited was 8 nm. That is, when the graphene composite layer 60 having thickness of 4.5 nm is deposited, mathematically, the curvature radius R increases 4.5 nm. However, actually, the curvature radius R increased only 3 nm. It is assumed that it is because thickness of the graphene composite layer 60 is smaller than 4.5 nm at a most distal end portion where a curvature radius is measured.

Note that it is evident from a measurement result of electric resistance and a transmission electron microscope observation that the carbon composite layer 61 changed to the graphene composite layer 60 according to the heating. However, to make it double sure, this was confirmed with a separately manufactured sample. That is, a metal layer made of Sn was deposited 15 nm on a thermally oxidized silicon ($SiO_2$) substrate in a vacuum by the laser abrasion method. Further, an amorphous carbon layer was deposited 5 nm on the metal layer in a vacuum by the laser abrasion method. During the depositing of both the layers, a degree of vacuum was within a range of $1.0 \times 10^{-5}$ Pa to $9.9 \times 10^{-5}$ Pa, more specifically, within a range of $3 \times 10^{-5}$ Pa to $7 \times 10^{-5}$ Pa. Thereafter, the sample was attached on the substrate heating holder. Heating at 250° C. for one hour was performed in a vacuum. A degree of vacuum during the heating was within a range of $1.0 \times 10^{-4}$ to $9.9 \times 10^{-4}$ Pa, more specifically, within a range of $1\times10^{-4}$ Pa to $7\times10^{-4}$ Pa. Thereafter, a Raman spectroscopic analysis of the sample cooled to room temperature was performed. A result of the Raman spectroscopic analysis is shown in FIG. 6.

As shown in FIG. 6, other than a peak deriving from $SiO_2$ (519 $cm^{-1}$) of the substrate, a 2D (2713 $cm^{-1}$) peak indicating formation of graphene, a G (1584 $cm^{-1}$) peak indicating graphitization, and a D (1352 $cm^{-1}$) peak deriving from a defect can be confirmed. Because the 2D peak is confirmed and the D peak is extremely small compared with the G peak ($I_G/I_D$=3.37), it is seen that a high-quality graphene layer with few defect is formed. From an intensity ratio ($I_{2D}/I_G$=0.54) of the 2D peak and the G peak, it is shown that the graphene layer is a multilayer graphene layer including a plurality of layers equal to or more than three layers. Note that because thickness of the amorphous carbon layer was 5 nm, if entire amorphous carbon changes to graphene, theoretically, the graphene layer includes sixteen to seventeen layers. Because the same Raman spectrum was obtained on an entire surface of the substrate, it was confirmed that the graphene layer was formed on the entire surface of the substrate.

The cantilever 1 can be used as a cantilever for electric characteristic measurement. The cantilever 1 can be used for, for example, an EFM (electric force microscope), an SCM (scanning capacitance microscope), a KPM (Kelvin probe force microscope), an SSRM (scanning spreading resistance microscope), an electrostatic force microscope, a PDM (phase detection microscope), an SCFM (scanning chemical force microscope), an SEcM (scanning electrochemical microscope), an SCPM (scanning chemical potential microscope), an SICM (scanning ion conduction microscope), and electric characteristic measurement including nano-potential difference measurement.

Note that in the embodiment, the tetrahedral shape is described as the shape of the protrusion section 30 of the cantilever 1. If a vertex is an acute angle, the same effect can be obtained with a protrusion section having a pyramid shape of a pyramidal shape or a polygonal shape or a conical shape. A material of the protrusion section 30 of the cantilever 1 does not need to be silicon and may be, for example, silicon nitride or may be a material different from a material of the lever section 20 or the supporting section 10.

The metal layer 40 in the embodiment may include at least any one of Zn, Sn, Bi, Pb, Tl, Cs, In, Cd, Rb, Ga, K, Na, Se, and Li. In particular, the metal layer 40 desirably includes any one of Zn, Sn, Bi, Pb, Tl, Cs, In, Cd, Rb, Ga, K, Na, Se, and Li as a main component. Note that the main component refers to a component occupying 50 at % or more of the metal layer 40. The metal layer 40 may be any of simple substance metal formed of one kind of metal atoms, a mixture obtained by mixing a plurality of kinds of metal formed of one kind of metal atoms, and an alloy formed of a plurality of kinds of metal atoms.

As a depositing method for the metal layer 40, it is possible to adopt various depositing methods for depositing a target material on a surface of a base material. Examples of the depositing method include a sputtering method, a vapor deposition method, a laser abrasion method, an inkjet method, a printing method, a spin coat method, an immersion method, and a chemical vapor deposition method (CVD method). The inkjet method is a method of spraying droplets of material liquid and depositing a target material on a surface of a base material using an inkjet printer. The immersion method is a method of immersing a base material in material liquid and depositing a target material on a surface of the base material.

A deposition atmosphere may be any of a vacuum, an inert gas atmosphere, and atmospheric air. For example, when the material is deposited by the inkjet method or the immersion method, the deposition atmosphere is the atmospheric air. Note that the vacuum referred to in the specification means a degree of vacuum of a pressure in a degree realizable by a vacuum pump. When the material is deposited in the vacuum, the vacuum is desirably set to a degree of vacuum of 1000 Pa or lower and more desirably set to a degree of vacuum of 10 Pa or lower.

On the other hand, the amorphous carbon is described as the carbon material layer 51. However, the carbon material layer 51 is not limited to the amorphous carbon. The same effect can be obtained if the carbon material layer 51 is a layer including a carbon element such as silicon carbide (SiC), glassy carbon (g-C), diamond-like carbon (DLC), amorphous carbon (a-C), titanium carbide (TiC), tungsten carbide (WC), chrome carbide (CrC), vanadium carbide (VC), or a niobium carbide (NbC). Further, a depositing method for the carbon material layer 51 may be the CVD method or the like.

That is, the carbon material layer 51 is not limited to be formed of only the carbon atoms. Further, the carbon material layer 51 may be an organic matter including oxygen, hydrogen, nitrogen, or the like rather than an inorganic matter. As the depositing method for the carbon material layer 51, it is possible to adopt various depositing methods for depositing a target material on a surface of a base material similarly to the depositing method for the metal layer 40. A deposition atmosphere may be any of a vacuum, an inert gas atmosphere, and atmospheric air similarly to the forming method for the metal layer 40.

Thickness of the metal layer 40 is desirably 0.1 nm or more and particularly desirably 1 nm or more. If the thickness of the metal layer 40 is equal to or larger than the range, the metal layer 40 achieves a catalyst action. If the thickness of the metal layer 40 is 7 nm or less, a spatial resolution of the cantilever can be secured.

Thickness of the carbon material layer 51 is desirably 0.3 nm or more and 7 nm or less. The thickness of the carbon material layer 51 is thickness of the graphene layer 50. Therefore, if the thickness of the carbon material layer 51 is equal to or larger than the range, electric conductivity can be secured. That is, although the carbon material layer 51 having thickness of 0.3 nm is the single graphene layer 50, electric conductivity is secured.

If total thickness of the thickness of the metal layer 40 and the thickness of the carbon material layer 51, that is, thickness of the carbon composite layer 61 is 7 nm or less, the curvature radium R of the distal end portion of the cantilever can be set to 10 nm or less. Therefore, the spatial resolution of the cantilever can be secured.

Note that by depositing a material including nitrogen and carbon, for example, a material including melamine as the carbon material layer, a graphene layer doped with nitrogen by heating treatment can be formed. The nitrogen-doped graphene layer, in which nitrogen atoms replace 0.1 at % to 20 at % of carbon atoms, is more excellent in electric conductivity than a pure graphene layer. Therefore, the nitrogen-doped graphene layer can be suitably used for the cantilever. An electric characteristic of the graphene layer can also be improved by doping an element such as boron, fluorine, or chloride.

That is, the carbon material layer 51 may include atoms other than carbon and catalyst metal, for example, oxygen, hydrogen, nitrogen, boron, fluorine, or chloride. In particular, when nitrogen, boron, fluorine, or chloride is included in the carbon material layer 51, the nitrogen, the boron, the fluorine, or the chloride is doped by heating treatment. A graphene layer with improved electric conductivity is formed.

In the manufacturing method in the embodiment, it is thought that the metal material, which is the catalyst, is melted by heating and the carbon atoms dissolve in the liquefied metal material. The carbon atoms dissolved in the metal material diffuse and precipitate on the surface of the metal layer and are regularly arrayed, whereby the graphene layer 50 is formed.

A dissolution amount and diffusion speed of the carbon atoms greatly increase when the metal changes from solid to liquid. The metal layer 40 is made of a low-melting point metal material. Therefore, with the manufacturing method in the embodiment, the graphene layer is formed at a low temperature compared with the conventional graphene layer forming method by the metal catalyst.

A heating temperature in the heating step may be equal to or higher than the melting point (MP) of the metal layer 40. However, the heating temperature is more desirably equal to or higher than a temperature higher than the melting point by 10° C. (MP+10° C.). An upper limit of the heating temperature is 450° C. or lower that does not damage the cantilever body made of silicon or/and silicon nitride. The heating temperature does not need to be set to a temperature greatly higher than the melting point MP. The heating temperature is desirably equal to or lower than, for example, a temperature 30° C. higher than the melting point (MP+30° C.).

A lower limit of the heating temperature may be lower than 300° C. and may be, for example, equal to or lower than 250° C. according to the melting point MP of the metal layer. Note that a lower limit of the melting point MP of the metal layer is not particularly limited. However, from the viewpoint of stability, the lower limit of the melting point MP of the metal layer is desirably equal to or higher than room temperature and particularly desirably 80° C. or higher. Further, because the manufacturing method in the embodiment is the non-transfer method, the graphene layer can be easily deposited on a distal end portion of a small-diameter protrusion section.

Note that even if the metal material is not melted, when the metal material is heated to a temperature slightly lower than the melting point MP, the diffusion speed of the carbon atoms greatly increases.

Therefore, the graphene layer is also obtained when the heating temperature is equal to or lower than the melting point MP of the metal layer 40. The heating temperature may be equal to or lower than a heat resistant temperature of the cantilever 1. However, to minimize damage due to heat, the heating temperature is desirably a temperature slightly lower than the melting point MP of the metal material of the metal layer 40, for example, a temperature 20° C. lower than the melting point (MP−20° C.) or higher and particularly desirably a temperature 10° C. lower than the melting point (MP−10° C.) or higher.

For example, when Sn (MP=230° C.) is used as the metal material of the metal layer 40, the heating temperature is particularly desirably 220° C. that is (MP−10)° C. or higher and 260° C. that is (MP+30° C.) or lower. Similarly, when a Sn alloy with 3 at % Ag-3 at % Bi-3 at % In (MP=200° C.) is used as the metal material, the heating temperature is particularly desirably 190° C. or higher and 230° C. or lower. Similarly, when Zn (MP=420° C.) is used as the metal layer, the heating temperature is particularly desirably 410° C. or higher and 450° C. or lower.

That is, the manufacturing method for the cantilever including the metal layer 40 formed by metal including, as a main component, any element among Zn (MP=420° C.), Sn (MP=230° C.), Bi (MP=271° C.), Pb (MP=328° C.), Tl (MP=304° C.), Cs (MP=29° C.), In (MP=157° C.), Cd (MP=321° C.), Rb (MP=38.5° C.), Ga (MP=30° C.), K (MP=64° C.), Na (MP=98° C.), Se (MP=217° C.), and Li (MP=179° C.) is a low-temperature process.

When biological safety, easiness of layer deposition, a dissolution degree of carbon, cost, and the like are considered, the metal layer 40 desirably includes at least any one of Sn, Zn, Bi, In, and Se and particularly desirably includes any one of Sn, Zn, Bi, In, and Se as a main component. Further, the melting point MP of the metal layer 40 is desirably 80° C. or higher and 420° C. or lower.

For example, antimony (Sb), the melting point MP of which is 631° C., cannot be used as the metal layer 40 of the present invention.

Note that even with metal called whole non-solid solution system in which carbon does not dissolve, for example, gallium (Ga), a graphene layer is sometimes formed by the manufacturing method in the embodiment. It is assumed that this is because metal forming a carbon solid solution is included as an impurity.

However, it goes without saying that the metal layer 40 is desirably made of carbon and metal or an alloy forming a solid solution.

Modifications of the Embodiment

A cantilever in modifications of the embodiment and a manufacturing method for the cantilever in the modifications are similar to the cantilever 1 and the like in the embodiment and have the same effects. Therefore, components having the same functions are denoted by the same reference numerals and signs and explanation of the components is omitted. Note that configurations, film thicknesses, and the like of respective layers, for example, a composition of a metal film, are the same as the configurations, the film thicknesses, and the like of the respective layers of the cantilever 1 and the like in the embodiment.

<Modification 1>

Figure 7A:
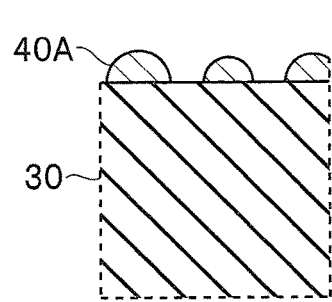
FIG. 7A is a partial sectional view for explaining a manufacturing method for a cantilever in a modification 1.

As shown in FIG. 7A, in a manufacturing method for a cantilever 1A in a modification 1, structure of a metal layer 40A is not a continuous layer and is island-shaped.

That is, when thickness of the metal layer is small, the metal layer tends to be island-shaped depending on a type of a material (an element) of the metal layer. For example, when the material is Sn, the metal layer tends to be island-shaped at thickness less than 3 nm. Note that the thickness of the island-shaped metal layer 40A is set to an integration average. In other words, thickness of the island-shaped metal layer 40A melted to be a continuous film is regarded as the thickness of the island-shaped metal layer.

Figure 7B:
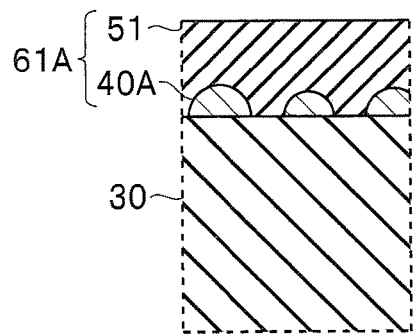
FIG. 7B is a partial sectional view for explaining the manufacturing method for the cantilever in the modification 1.

As shown in FIG. 7B, the carbon material layer 51 having thickness of 2 nm made of amorphous carbon is deposited on the island-shaped metal layer 40A having thickness of 2 nm made of Sn.

The carbon of the carbon material layer 51 solid-dissolves (dissolves) in the metal in the heating step. In general, when an A/B stacked body is heated to dissolve, an element having small surface energy diffuses and separates to be an upper layer. In the case of the modification, the carbon has small surface energy compared with the metal (Sn). Therefore, as shown in FIG. 7C, the carbon solid-dissolved (dissolved) in the metal forms the graphene layer 50 to cover the metal layer 40A.

Figure 7C:
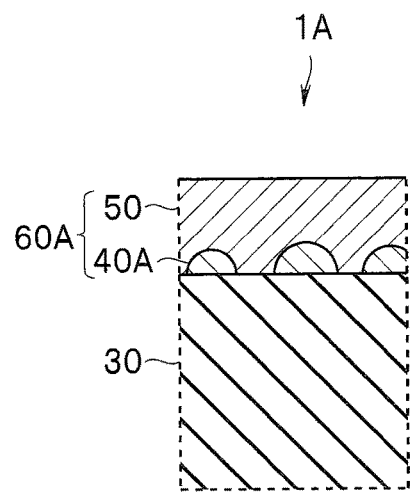
FIG. 7C is a partial sectional view of the cantilever in the modification 1.

That is, as shown in FIGS. 7B and 7C, the carbon material layer 51 not in direct contact with the metal material also changes to the graphene layer 50 according to the heating treatment. A reason for this is unclear. However, the reason is considered that the island-shaped metal layer 40A changes to a continuous film when being heated to dissolve.

In the manufacturing method for the cantilever 1A in the modification, even a metal material that tends to be island-shaped when being reduced in thickness can be used as catalyst metal. Because the cantilever 1A includes the metal layer 40A having small average thickness, thickness of a graphene composite layer of the cantilever 1A was 4 nm and a curvature radius R of a distal end portion of the cantilever 1A was 6 nm.

In particular, it is also possible to form a graphene layer, which does not include catalyst metal as a foundation, at a most distal end portion of the protrusion section 30. For example, even if a metal material is not deposited on a most distal end portion less than 1 μm (e.g., 500 nm) from a distal end of the protrusion section that affects spatial resolution of the cantilever, a graphene layer can be disposed at the most distal end portion if an island-shaped metal material is deposited in a place exceeding 1 μm from the distal end.

<Modification 2>

Figure 8:
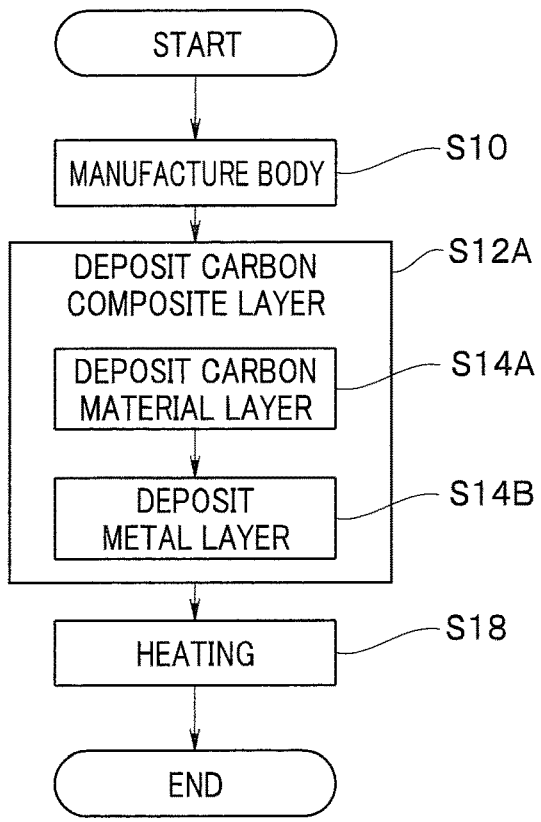
FIG. 8 is a flowchart of a manufacturing method for a cantilever in a modification 2.

As shown in FIG. 8, in a manufacturing method for a cantilever 1B in a present modification, a carbon-composite-layer depositing step 12A includes a step (S14A) in which a carbon material layer is deposited and a step (S14B) in which the metal layer is deposited on the carbon material layer.

Figure 9A:
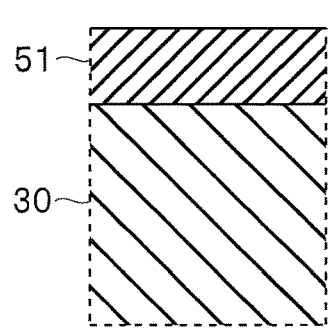
FIG. 9A is a partial sectional view for explaining the manufacturing method for the cantilever in the modification 2.

That is, as shown in FIG. 9A, the carbon material layer 51 having thickness of 1.5 nm made of amorphous carbon was deposited on the surface of the cantilever body (the protrusion section 30).

Figure 9B:
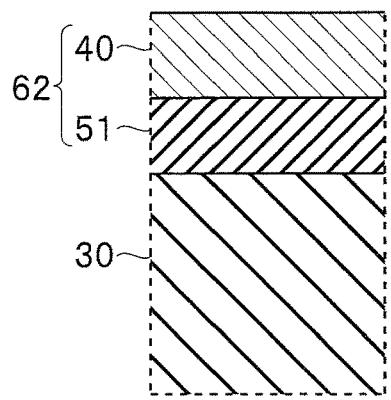
FIG. 9B is a partial sectional view for explaining the manufacturing method for the cantilever in the modification 2.

Subsequently, as shown in FIG. 9B, the metal layer 40 having thickness of 3 nm made of Sn was deposited on the carbon material layer 51. Note that the deposited metal layer 40 may be island-shaped.

Figure 9C:
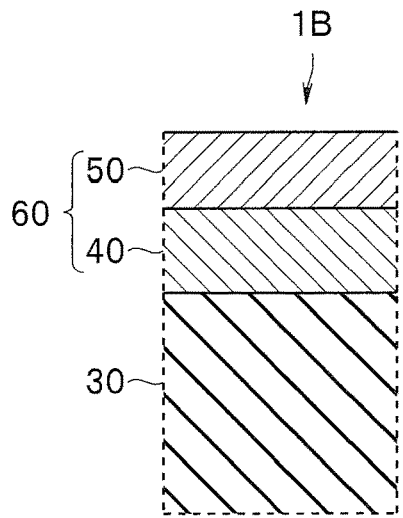
FIG. 9C is a partial sectional view of the cantilever in the modification 2.

Heating at 250° C. for one hour was performed in a vacuum. Thereafter, cooling was performed to room temperature. Then, as shown in FIG. 9C, a crystalline carbon composite layer 60B of the cantilever 1B changed to the metal layer 40 and the graphene layer 50 on the metal layer 40 like the crystalline carbon composite layer 60 of the cantilever 1.

As already explained, the carbon has small surface energy compared with the metal (Sn). Therefore, as shown in FIG. 9C, the carbon solid-dissolved (dissolved) in the metal in the heating step precipitates to form the graphene layer 50, during cooling, to cover the metal layer 40 and forms.

Note that a part of the carbon solid-dissolved (dissolved) in the metal in the heating step precipitates on an interface between the cantilever body (the protrusion section 30) and the metal layer 40 to form the graphene layer 50. However, the part of the carbon is not shown in FIG. 9C.

<Modifications 3 and 4>

As shown in FIG. 10, in a manufacturing method for a cantilever 1C in a modification 3, a carbon-composite-layer depositing step 12C is a step (S12C) in which a mixed layer obtained by mixing a carbon material and a metal material is deposited.

That is, a mixed layer 63 having thickness of 5 nm made of 50 at % of amorphous carbon and 50 at % of Sn was deposited on the surface of the cantilever body (the protrusion section 30).

The mixed layer 63 changed to the crystalline carbon composite layer 60 shown in FIG. 11B according to the heating treatment (250° C.).

A content rate of Sn in the mixed layer 63 can be set within a range of 1 at % to 99 at % of the entire mixed layer 63.

Note that depending on the content rate of Sn in the mixed layer 63 and a heating/cooling condition, as shown in FIG. 11C, a crystalline carbon composite layer 60D formed by a crystalline carbon layer (a graphene layer 50D) including a metal material (Sn) on an inside is sometimes formed. A cantilever 1D in a modification 4, on a surface of which the crystalline carbon composite layer 60D is deposited, has the same effects as the effects of the cantilever 1 and the like because an outermost surface is covered with graphene.

Note that in the manufacturing method for the cantilever in the modification 2, depending on a condition, the crystalline carbon composite layer may have the same configuration as the configuration in the cantilever 1D, that is, metal-containing structure.

<Modification 5>

In a manufacturing method for a cantilever in a present modification, a step in which a carbon material layer is deposited and the heating step are regarded as being simultaneously performed.

Figure 12:
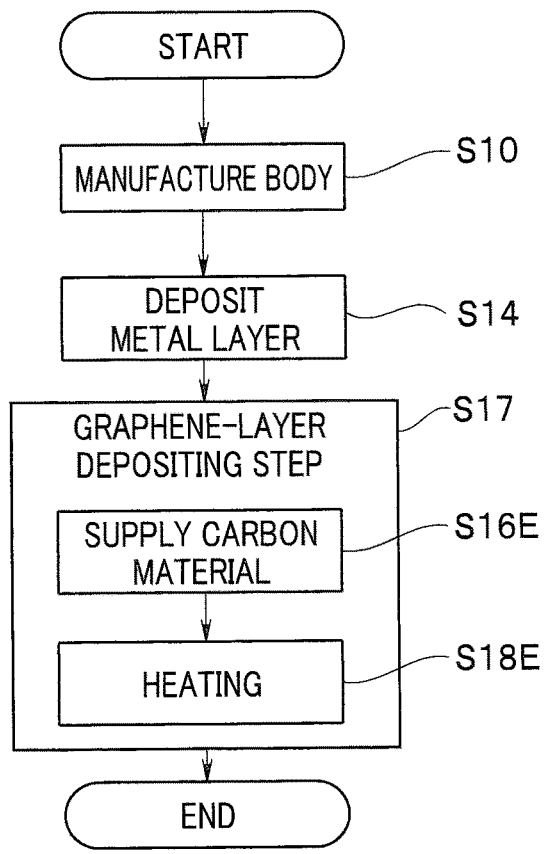
FIG. 12 is a flowchart of a manufacturing method for a cantilever in a modification 5.

That is, as shown in FIG. 12, after the metal-layer depositing step (S14), a graphene-layer depositing step S17 in which a carbon-material supplying step (S16E) and a heating step (S18E) are simultaneously performed is performed.

Figure 13A:
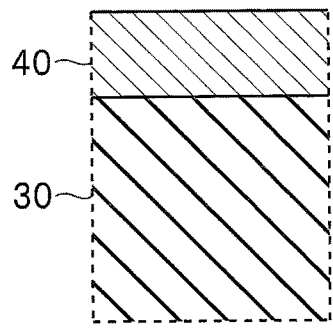
FIG. 13A is a partial sectional view for explaining the manufacturing method for the cantilever in the modification 5.

That is, as shown in FIG. 13A, the metal layer 40 having thickness of 1.5 nm made of Sn was deposited on the surface of the cantilever body (the protrusion section 30).

Figure 13B:
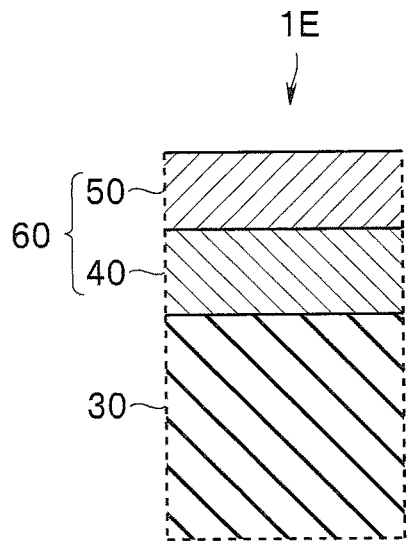
FIG. 13B is a partial sectional view of the cantilever in the modification 5.

Subsequently, by performing the heating treatment while supplying the carbon material, after cooling, as shown in FIG. 13B, a cantilever 1E in which the graphene layer 50 having thickness of 2 nm was formed on the metal layer 40 was manufactured.

Specifically, heating is performed while supplying a carbon material gas including carbon atoms. The heating may be performed in any of a vacuum, an inert gas atmosphere, a reducing atmosphere of hydrogen or the like, and atmospheric air.

Note that it goes without saying that, in the cantilevers in the modifications 2 to 5, the metal layer may be island-shaped as in the cantilever 1A in the modification 1.

<Modifications 6 and 7>

The manufacturing methods for the cantilevers 1 and 1A to 1E may further include a step of removing the metal layer 40 after the heating step for changing the carbon composite layer to the crystalline carbon composite layer including the metal material and the crystalline carbon. The metal-layer removing step is, for example, an additional heating step for performing heating at the same temperature as the temperature in the heating step and a treatment time period twice or more as long as a treatment time period in the heating step, an additional heating step at a higher temperature than the heating temperature, or an etching step.

According to the additional heating step, the metal material forming the metal layer evaporates when the heating temperature is equal to or higher than the melting point MP or sublimates when the heating temperature is lower than the melting point and disappears.

Figure 14A:
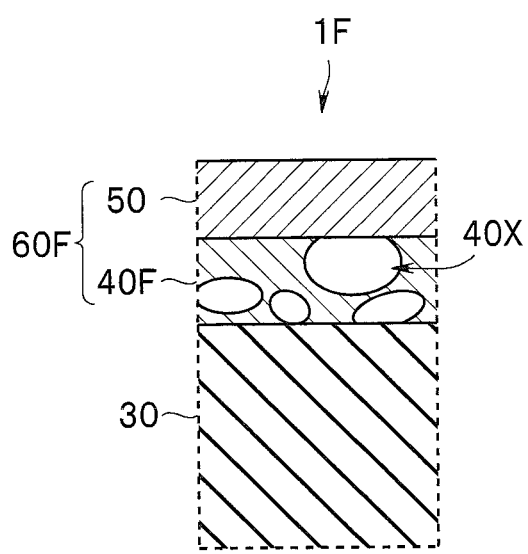
FIG. 14A is a partial sectional view of a cantilever in a modification 6.
Figure 14B:
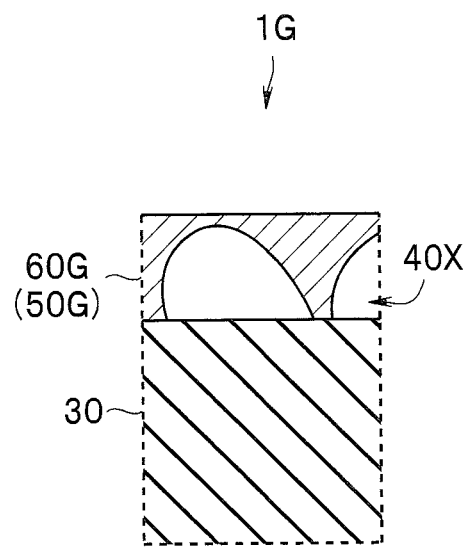
FIG. 14B is a partial sectional view of a cantilever in a modification 7.

For example, in a cantilever 1F in a modification 6 shown in FIG. 14A, a part of a metal layer 40F under the graphene layer (the crystalline carbon layer) 50 is a cavity 40X. Further, in a cantilever 1G in a modification 7 shown in FIG.

14B, a metal layer disappears and a part of a graphene layer (a crystalline carbon layer 60G) 50G is the cavity 40X.

According to the metal-layer removing step, in the cantilever, the graphene layer is apparently directly deposited on the substrate. The cantilever from which the metal layer is removed shows a higher spatial resolution because a curvature radius R of a distal end portion of the cantilever is smaller.

<Modifications 8 and 9>

In the above explanation, the cantilevers 1 and 1A to 1G in which the graphene layer 50 covers the upper surface SA on which the protrusion section 30 is formed is explained. However, what affects resolution is thickness of a conductive layer deposited on the distal end portion of the protrusion section 30.

Figure 15A:
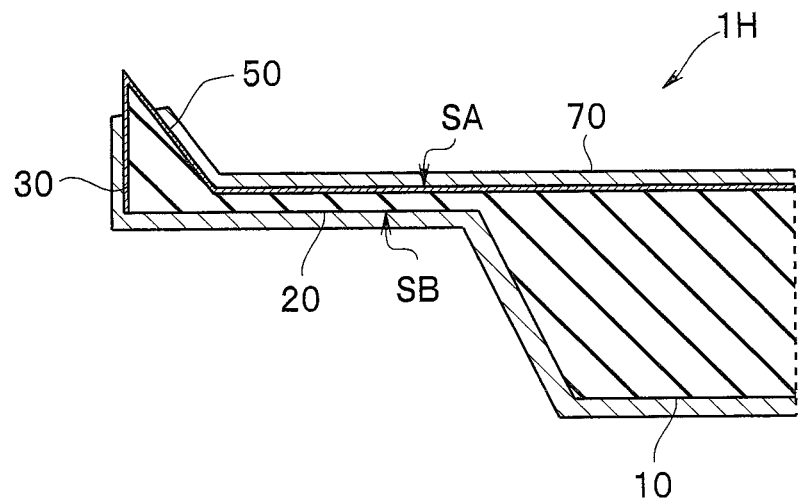
FIG. 15A is a sectional view of a cantilever in a modification 8.

In a cantilever 1H in a modification 8 shown in FIG. 15A, a conductive metal layer 70 made of aluminum having thickness of 0.2 µm is deposited on a root section of the protrusion section 30, a lever section, and a supporting section. For example, the cantilever 1H is manufactured by covering an entire surface of the cantilever with an aluminum layer after depositing the graphene layer 50 and thereafter selectively removing the aluminum layer at a distal end portion of the cantilever.

Only the graphene layer 50 showing high electric conductivity even if thickness is small is deposited on the distal end portion of the protrusion section 30. That is, although the graphene layer 50 has low electric resistance, the conductive metal layer 70 made of gold, platinum, aluminum, or the like having sufficiently large thickness has smaller electric resistance and is more easily deposited than the graphene layer 50. Therefore, the cantilever 1H has the same spatial resolution as the spatial resolution of the cantilever 1 and the like and has lower electric resistance than the electric resistance of the cantilever 1 and the like.

Note that when the conductive metal layer 70 is too thick, thickness of the lever section 20 of the cantilever is increased and a mechanical characteristic of the cantilever is deteriorated. Therefore, thickness of the conductive metal layer 70 is desirably 1 µm or less and particularly desirably 0.3 µm or less.

Figure 15B:
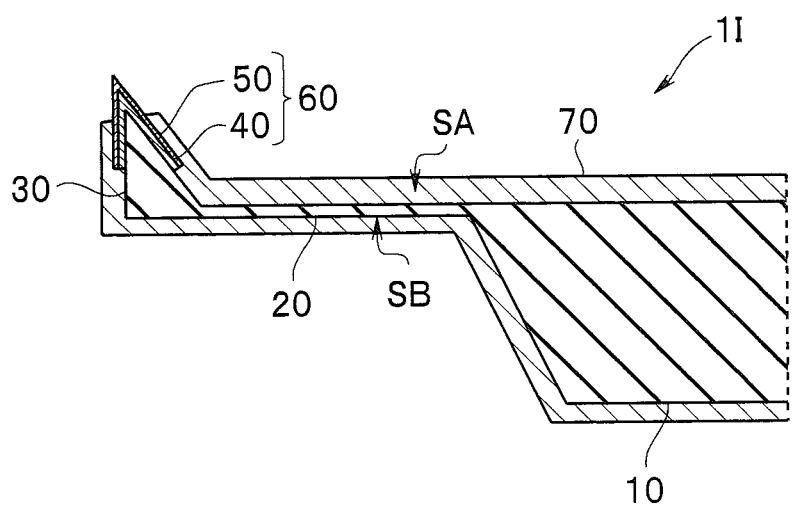
FIG. 15B is a sectional view of a cantilever in a modification 9.

Note that it goes without saying that, as in a cantilever 1I in a modification 9 shown in FIG. 15B, the graphene composite layer 60 including the graphene layer 50 and the metal layer 40 may be deposited on only the distal end portion of the protrusion section 30. Note that in the cantilever 1I, the conductive metal layer 70 is deposited after the deposition of the graphene composite layer 60. On the other hand, the graphene composite layer 60 may be deposited after the deposition of the conductive metal layer 70.

<Modification 10>

Figure 16A:
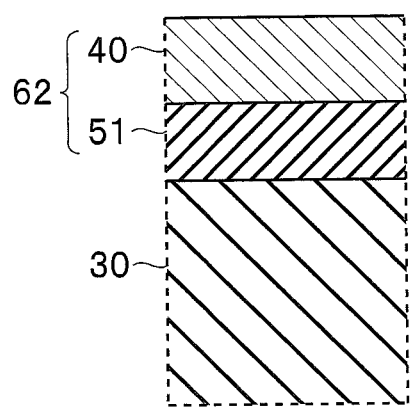
FIG. 16A is a partial sectional view for explaining a manufacturing method for a cantilever in a modification 10.

As shown in FIG. 16A, in a cantilever 1J in a modification 10, first, the carbon material layer 51 having thickness of 1.5 nm made of amorphous carbon was deposited on the surface of the cantilever body (the protrusion section 30). Further, the metal layer 40 having thickness of 3 nm made of In (indium) was deposited on the carbon material layer 51. That is, a carbon composite layer 62 includes the carbon material layer 51 and the metal layer 40 on the carbon material layer 51.

Figure 16B:
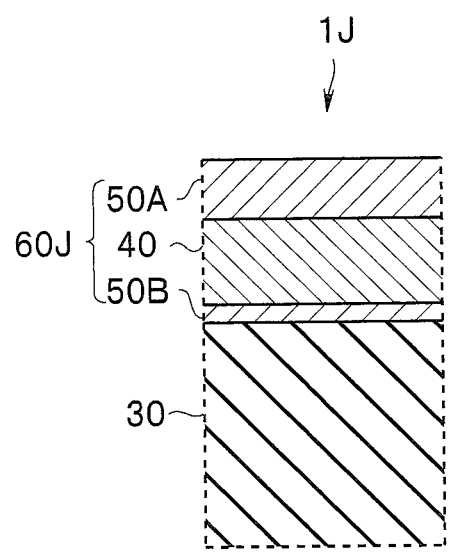
FIG. 16B is a partial sectional view of the cantilever in the modification 10.

Heating at 170° C. for one hour was performed in a vacuum. Thereafter, cooling was performed to room temperature. Then, as shown in FIG. 16B, the carbon composite layer 62 changed to a crystalline carbon composite layer 60J including the metal layer 40, a first graphene layer 50A on the metal layer 40, and a second graphene layer 50B under the metal layer 40.

A melting point (MP) of indium is 157° C. Therefore, in the heating step at 170° C., the indium melts and carbon dissolved in the melted indium diffuses and reprecipitates on the metal layer 40 as the first graphene layer 50A.

As explained above concerning the cantilever 1B in the modification 2, a part of the carbon material layer 51 changes to the second graphene layer 50B under the metal layer 40 through reprecipitation. Note that the second graphene layer 50B is thinner than the first graphene layer 50A.

In the cantilever 1J, even when the temperature in the heating step was 150° C., that is, lower than the melting point (MP) of indium, the crystalline carbon composite layer 62 changed to the metal layer 40, the first graphene layer 50A on the metal layer 40, and the second graphene layer 50B under the metal layer 40.

Further, as the metal layer 40, an alloy material having a lower melting point than the main component metal may be used. For example, a melting point of an SnIn alloy is, for example, 117° C., which is lower than a melting point (230° C.) of Sn and a melting point (157° C.) of In. A cantilever including the metal layer 40 having the low melting point can be manufactured by heating treatment at a lower temperature. For example, a cantilever including a metal layer, a melting point MP of which is 117° C., can also be manufactured at 97° C. (MP−20° C.) lower than 100° C.

<Modification 11>

Figure 17:
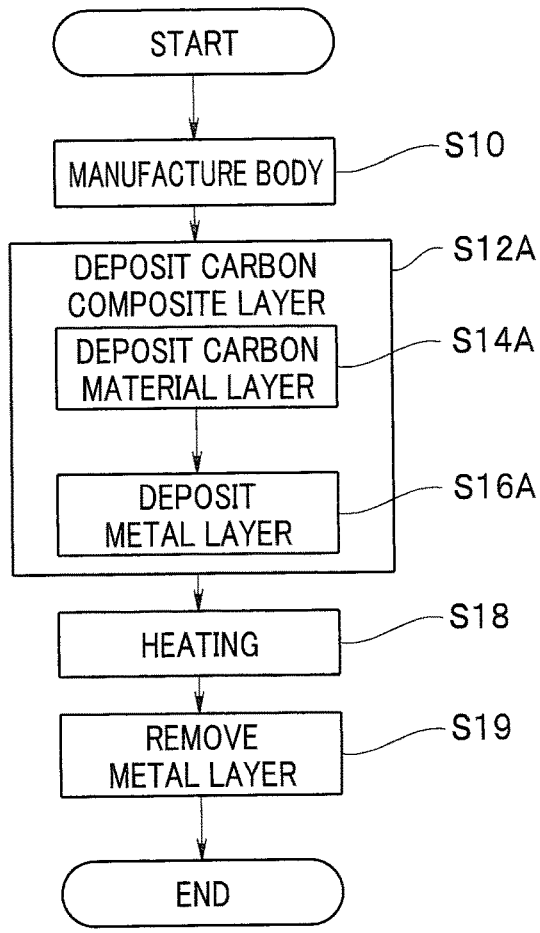
FIG. 17 is a flowchart of a manufacturing method for a cantilever in a modification 11.

As shown in a flowchart of FIG. 17, a manufacturing method for a cantilever 1K in a modification 11 further includes a step (step S19) for removing the metal layer 40.

In the manufacturing method for the cantilever 1K, first, the carbon material layer 51 having thickness of 10 nm made of amorphous carbon was deposited on the surface of the cantilever body (the protrusion section 30). Further, the metal layer 40 having thickness of 50 nm made of an In—Sn alloy, a melting point MP of which is 120° C., was deposited on the carbon material layer 51. That is, the carbon composite layer 62 includes the carbon material layer 51 and the metal layer 40 on the carbon material layer 51.

Heating treatment for performing heating at 100° C. for one hour in nitrogen and, thereafter, performing cooling to room temperature was performed. According to the heating treatment, like the crystalline carbon composite layer 62 shown in FIG. 16B, the carbon composite layer 62 changes to the metal layer 40, the first graphene layer 50A on the metal layer 40, and the second graphene layer 50B under the metal layer 40.

Further, in the manufacturing method for the cantilever 1K, the step (step S19) for removing the metal layer 40 was performed after the heating step (step S18). That is, the metal layer 40 and the first graphene layer 50A were removed by a chemical etching process by an acid solution (10 weight % nitric acid). The first graphene layer 50A does not dissolve in the acid solution. However, when the metal layer 40 dissolves according the chemical etching process, the first graphene layer 50A on the metal layer 40 is also peeled from the cantilever.

Figure 18:
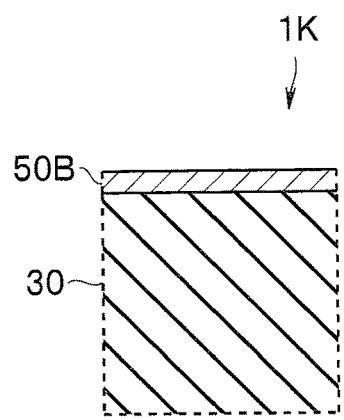
FIG. 18 is a partial sectional view of the cantilever in the modification 11.

As shown in FIG. 18, only the second graphene layer 50B is deposited on a distal end portion of the cantilever 1K. Thickness of the second graphene layer 50B was 2 nm. A curvature radius R of the distal end portion was 6 nm. That is, the thickness of the second graphene layer 50B is smaller than thickness of the first graphene layer 50A estimated as 8 nm. The thick first graphene layer 50A and the thick metal layer 40 are removed. Only the thin second graphene layer 50B remains at the distal end portion of the cantilever 1K.

Note that when heating at 130° C. for 0.5 hour was performed in a vacuum as the heating treatment, a cantilever having substantially the same configuration as the configuration of the cantilever 1K was manufactured.

As in the cantilever 1I in the modification 9, the second graphene layer 50B may be deposited on the distal end portion only of the protrusion section 30.

It is unrealistic to specify the manufacturing method for a cantilever manufactured by the manufacturing method of the present invention. For example, it is extremely difficult to prove that, in the cantilever 1K in the modification 11 shown in FIG. 18, the metal layer 40 and the first graphene layer 50A are removed in the metal-layer removing step (S19). For example, it is likely that a state of an interface between a substrate and a graphene layer in the cantilever manufactured by the manufacturing method for the cantilever of the present invention is different from the state in the cantilever manufactured by conventional manufacturing method. However, even if structure of the interface, for example, crystal structure of the interface can be analyzed using a transmission electron microscope or the like, the manufacturing method cannot be proved from the structure.

It cannot be specified after the manufacturing that the temperature in the heating step is 450° C. or lower. That is, in the cantilever manufactured by the manufacturing method for the cantilever of the present invention, a word for specifying structure or a characteristic related to a difference from the conventional technique cannot be found. It is impossible or unrealistic to analyze and specify, based on measurement, such structure or a characteristic.

The present invention is not limited to the embodiment and the like explained above. Various changes and alterations, for example, combinations of the constituent elements of the embodiment are possible in a range in which the gist of the present invention is not changed.

What is claimed is:

1. A cantilever used in a scanning probe microscope, the cantilever comprising a supporting section, a lever section, and a protrusion section, which is a probe, wherein
a crystalline carbon composite layer including a crystalline carbon nanomaterial and a metal material, a melting point of which is 420° C. or lower, is deposited on a distal end portion of the protrusion section.

2. The cantilever according to claim 1, wherein thickness of the crystalline carbon composite layer is 7 nm or less, and a curvature radius of the distal end portion is 10 nm or less.

3. The cantilever according to claim 2, wherein the metal material includes at least any one of Zn, Sn, Bi, Pb, Tl, Cs, In, Cd, Rb, Ga, K, Na, Se, and Li.

4. The cantilever according to claim 3, wherein a melting point of the metal material is 250° C. or lower.

5. The cantilever according to claim 4, wherein the metal material includes at least any one of Sn, Zn, Bi, In, and Se.

6. The cantilever according to claim 1, wherein the crystalline carbon composite layer includes a crystalline carbon layer made of the crystalline carbon nanomaterial and a metal layer made of the metal material.

7. A manufacturing method for a cantilever in which a crystalline carbon layer made of a crystalline carbon nanomaterial is deposited on a distal end portion of a protrusion section of a cantilever body including a supporting section, a lever section, and the protrusion section, which is a probe, the manufacturing method for the cantilever comprising:
a step in which the cantilever body is manufactured;
a carbon-composite-layer depositing step in which a carbon composite layer including a metal material, a melting point of which is 420° C. or lower, and a carbon material is deposited on the distal end portion of the protrusion section; and
a heating step in which a temperature for changing the carbon composite layer to a crystalline carbon composite layer including the crystalline carbon layer and a metal layer made of the metal material is 450° C. or lower.

8. The manufacturing method for the cantilever according to claim 7, wherein thickness of the carbon composite layer is 7 nm or less, and a curvature radius of the distal end portion is 10 nm or less.

9. The manufacturing method for the cantilever according to claim 8, wherein the metal material includes at least any one of Zn, Sn, Bi, Pb, Tl, Cs, In, Cd, Rb, Ga, K, Na, Se, and Li.

10. The manufacturing method for the cantilever according to claim 9, wherein a melting point of the metal material is 250° C. or lower.

11. The manufacturing method for the cantilever according to claim 10, wherein the metal material includes at least any one of Sn, Zn, Bi, In, and Se.

12. The manufacturing method for the cantilever according to claim 9, wherein a temperature in the heating step is equal to or higher than a melting point of the metal material.

13. The manufacturing method for the cantilever according to claim 9, wherein a temperature in the heating step is equal to or higher than a temperature 20° C. lower than a melting point of the metal material and is lower than the melting point of the metal material.

14. The manufacturing method for the cantilever according to claim 9, wherein the carbon-composite-layer depositing step includes a step in which a metal layer including the metal material is deposited and a step in which a carbon material layer including the carbon material is deposited on the metal layer.

15. The manufacturing method for the cantilever according to claim 9, wherein the carbon-composite-layer depositing step includes a step in which a carbon material layer including the carbon material is deposited and a step in which a metal layer including the metal material is deposited on the carbon material layer.

16. The manufacturing method for the cantilever according to claim 9, wherein the carbon-composite-layer depositing step is a step in which a mixed layer obtained by mixing the carbon material and the metal material is deposited.

17. The manufacturing method for the cantilever according to claim 9, further comprising a step of removing the metal material from the crystalline carbon composite layer after the heating step.

18. The manufacturing method for the cantilever according to claim 17, wherein the step of removing the metal material is a chemical etching step in which, from the crystalline carbon composite layer including a metal layer made of the metal material, a first crystalline carbon layer on the metal layer, and a second crystalline carbon layer under the metal layer, the metal layer and the first crystalline carbon layer are removed and the second crystalline carbon layer is not removed.

19. A cantilever manufactured by the manufacturing method for the cantilever according to claim 9.

20. A manufacturing method for a cantilever used in a scanning probe microscope in which a graphene layer is deposited on a distal end portion of a protrusion section of a cantilever body including a supporting section, a lever section, and the protrusion section, which is a probe,
the manufacturing method for the cantilever comprising:
a step in which the cantilever body is manufactured;
a carbon-composite-layer depositing step in which a carbon material layer including a carbon material is deposited on the distal end portion of the protrusion section and a metal layer made of a metal material including Sn or In as a main component is deposited on the carbon material layer;

a heating step in which a heating temperature is equal to or higher than a temperature 20° C. lower than a melting point of the metal material and is equal to or lower than a temperature 30° C. higher than the melting point of the metal material; and a chemical etching step for removing the metal layer.

* * * * *